W. N. WHITELEY.
Gleaner and Binder.
No. 231,248. Patented Aug. 17, 1880.
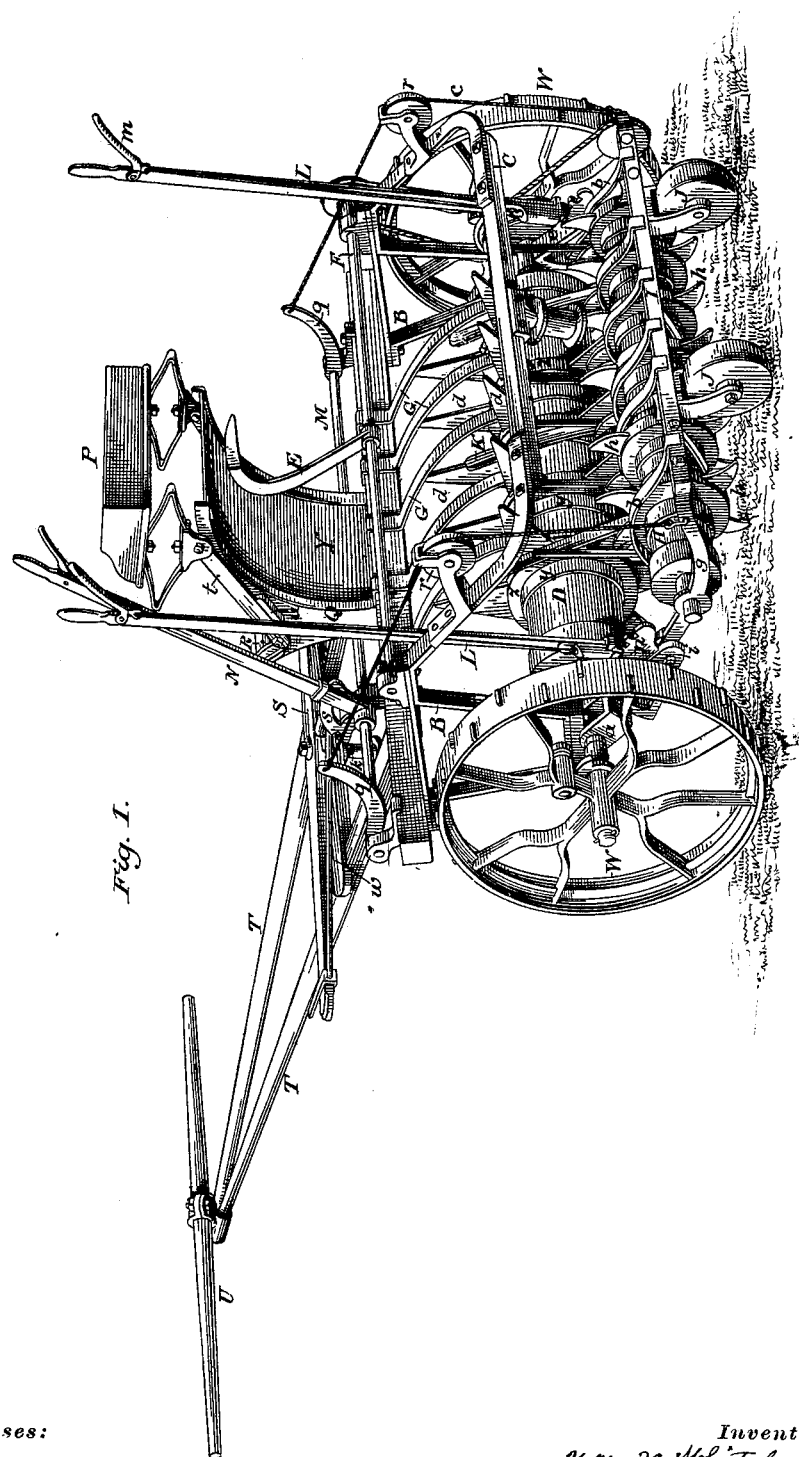
Fig. I.
Witnesses:
C. Clarence Poole
A. B. Smith
Inventor:
Wm. N. Whiteley
By his atty R. D. O. Smith

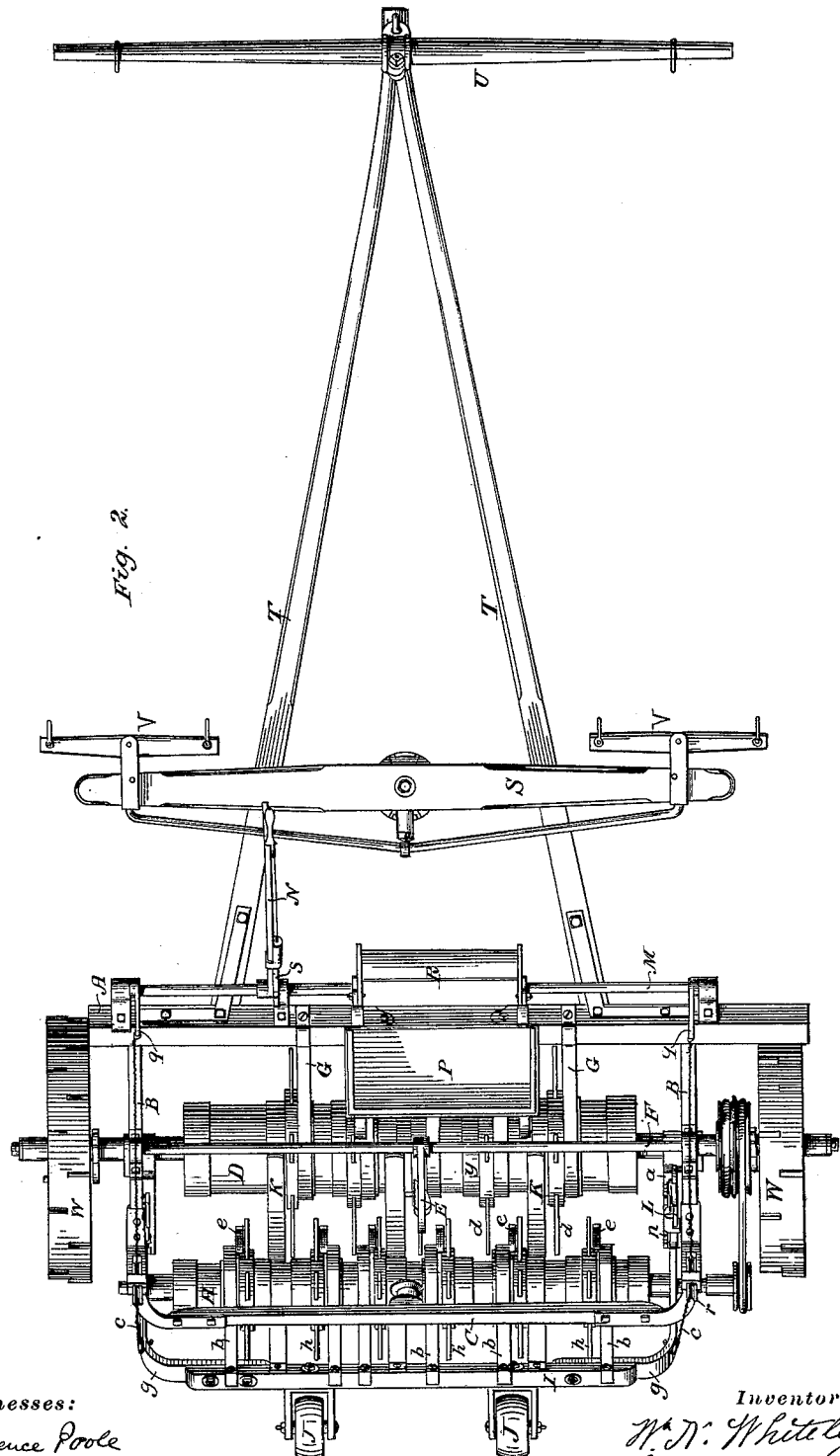

W. N. WHITELEY.
Gleaner and Binder.
No. 231,248.  Patented Aug. 17, 1880.
4 Sheets—Sheet 3.
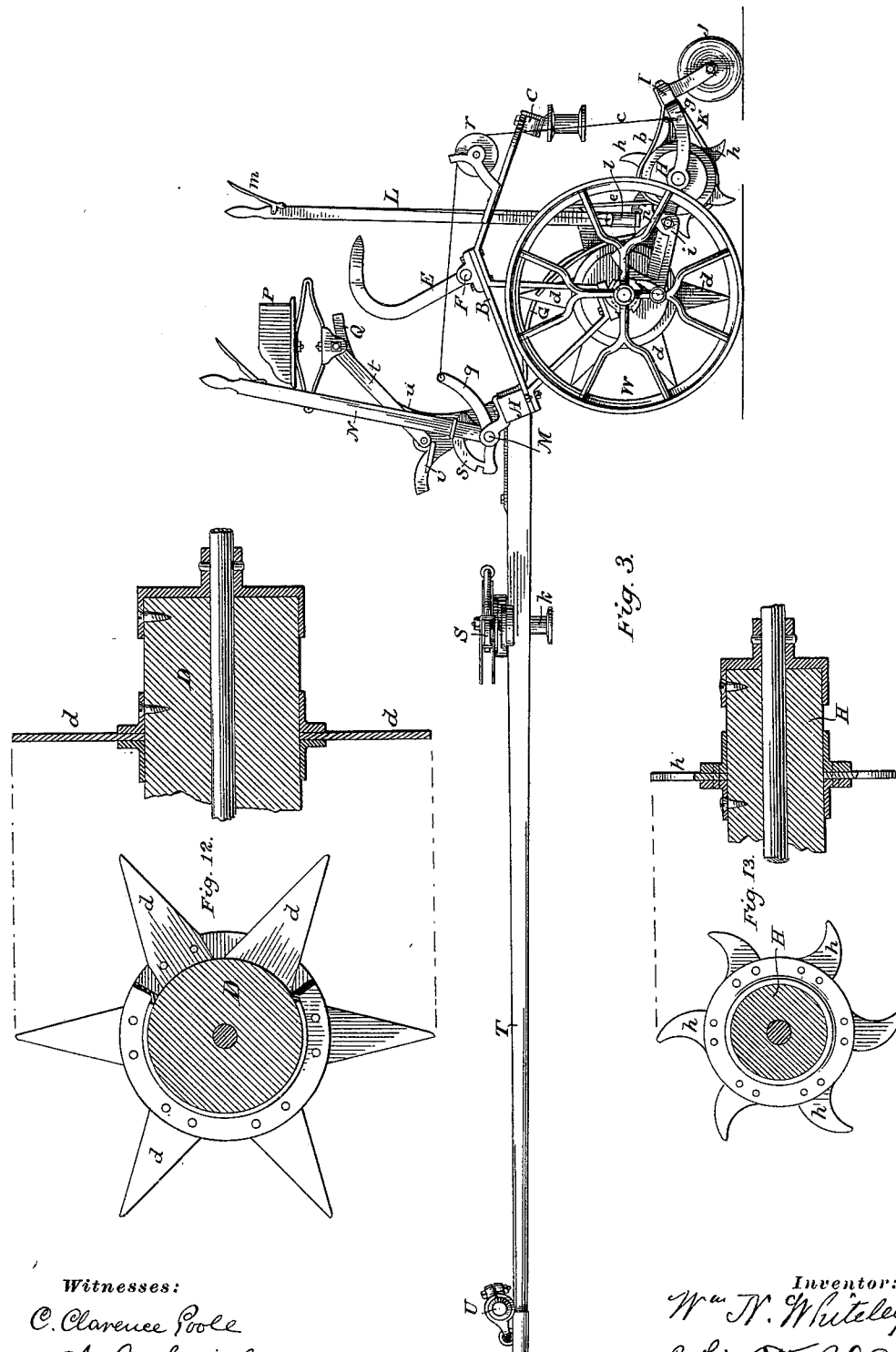

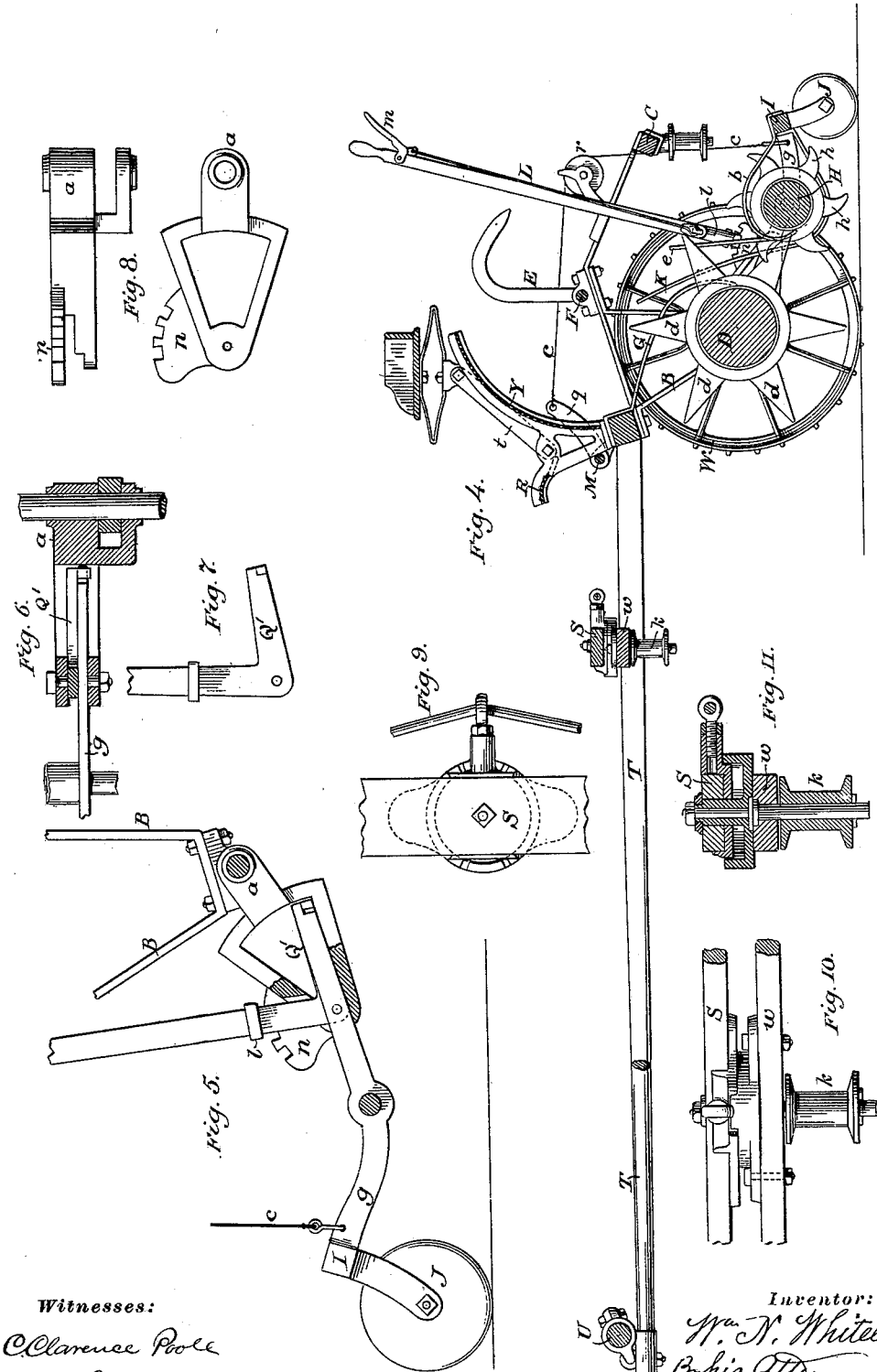
W. N. WHITELEY.
Gleaner and Binder.
No. 231,248. Patented Aug. 17, 1880.
4 Sheets—Sheet 4.

UNITED STATES PATENT OFFICE.

WILLIAM N. WHITELEY, OF SPRINGFIELD, OHIO.

GLEANER AND BINDER.

SPECIFICATION forming part of Letters Patent No. 231,248, dated August 17, 1880.

Application filed January 15, 1880.

*To all whom it may concern:*

Be it known that I, WILLIAM N. WHITELEY, of Springfield, in the county of Clarke, in the State of Ohio, have invented new and useful Improvements in that Class of Machines known as Gleaners and Binders; and I do hereby declare that the following is a full and exact description of the same, reference being had to the accompanying drawings, wherein—
Figure 1 is a perspective view of my machine. Fig. 2 is a plan of the same. Fig. 3 is a side elevation of the same. Fig. 4 is a longitudinal section. Figs. 5 to 13 are figures of details.
My present improvement refers to that part of the machine which gleans or gathers the cut grain and lifts it from the ground to be delivered to the binding mechanism, but does not relate to the mechanism whereby the bundle is bound. The binding devices, therefore, are not shown nor described in this application, with the exception of the band-carrying arm.

The essential parts of this invention are, first, an open center-pole, through which the driver can see the line-band and guide the machine over the center of the grain; second, a gleaner with the driver's seat arranged at the center in the plane of the binding-arm, whereby he is enabled to guide the machine perfectly in taking up the grain and see that it does its work; third, the lever adjustment of the back roller, whereby the driver can regulate the height of said roller above the ground while the machine is in operation to pass over obstacles, or for any other purpose; fourth, the lifting-lever and flexible connection for the rear gathering-cylinder, whereby it may be lifted entirely from the ground, and when upon the ground will permit it to conform to the undulations of the ground; fifth, the teeth or fingers of the gatherer or elevator are rigid and are set in rigid sockets in their respective cylinders.
That others may fully understand my invention, I will particularly describe it.

The frame consists of a beam, A, extending across the machine above and slightly in front of the wheels, and metallic brackets B, which extend down to the axle-boxes *a* and backward to support the operative parts of the machine, and a rear bar, C, parallel with the bar A.

A cylinder or elevator, D, extends nearly the whole distance between the brackets B.
This cylinder is armed with successive rows of radial arms or teeth *d*, whereby the grain is taken from the ground and delivered to the binder represented in the drawings by the binding arm and head E, mounted upon the revolving shaft F, whereby said head is carried.

Guide strips or slats G, preferably of elastic metal, have their front ends secured to the frame or bar A, and their rear ends curve over and behind the cylinder D and rest upon its surface between the rows of fingers *d*, so that the grain which is carried up by said fingers slides up on the upper surfaces of said slats until the fingers push said grain above their orbit of movement. Before, however, an excess has so accumulated the binding-arm E will have gathered and bound it into a bundle.

Behind the elevator D is a gatherer, H, which consists of a cylinder similar to D, though smaller, and similarly armed with rows of projecting teeth *h*, which are slightly hooked backward at their extremities, so that as they strike the ground they will not penetrate and turn up the dirt among the straw.
The gatherer H is mounted in bearings on the dragging-frame I, which is secured at the front in brackets *i*, which hang loosely upon the main axle, and at the back said frame I is supported upon one or more caster-wheels, J.
The revolution of the cylinder D is in the direction of the machine's advance, and the gatherer revolves in an opposite direction.

It is of importance that whatever straw is carried up by the gatherer should be stripped off and not carried over with the same. The guard-slats *b* are therefore employed, their rear ends being secured to the frame I and their front ends resting against the cylinder H, between the rows of teeth *h*, and upright strips are attached to the strips *e* near to the free ends. In addition to the strippers *b e*, other guide-strips, *k*, are secured at their rear ends to the frame I, and passing under the cylinder H, between the rows of teeth, extend upward nearly to the level of the shaft F. The grain as it is carried up by the elevator is therefore held above the guides G, and between said guides and the guides K.

The arms *g* of the dragging-frame are inserted at their forward ends in slots in the brackets i, and are pivoted therein with a range of motion of twenty-five degrees, or thereabout, so that when the ends of said arms drop to the bottom of said slots the front of the dragging-frame will descend toward the ground and the teeth h will touch the ground as they revolve when each arm g and its bracket i are out of line with each other. When, however, the end of the arm g is raised to the top of its slot, said arm and its bracket come into line with each other, or approach that condition, and the front end of the frame I is raised up. The rear of said frame is at a constant distance from the ground, being supported upon the wheels J, and therefore when the front of the frame I is elevated the cylinder H is raised also, and the cylinder H may be thus raised enough to clear the ground entirely and to pass over any obstruction ordinarily to be found in a grain-field.

The device which I have adopted for raising the bracket i and front of the frame I, with the cylinder H, at the will of the attendant, consists of a lever, L, which is pivoted in the bracket i at its lower end, and is provided with a latch, l, operated by a thumb-piece, m. Said latch engages with a rack, n, which is rigidly attached to the bracket i.

The lower end of the lever L is provided with a laterally-projecting foot, Q', like a bell-crank, and the extremity of said foot engages with the arm g near its extremity, so that when the lever is thrown backward or forward the extremity of said arm g will be raised or lowered, and may be maintained at suitable position intermediate between the extremities of motion by the latching-notches of the rack n. No labor is involved in lowering the frame I, because gravity will depress the arms g to their lowest limit whenever permitted.

Each end of the frame I is provided with a similar lever, L, and therefore the ends of said frame may be independently raised.

In transporting the machine from place to place it is desirable to raise the dragging-frame and wheels J entirely from the ground, and I have therefore mounted a shaft, M, upon the frame-bar A, and provided said shaft with two arms, q q, to the extremities of which cords c or other suitable flexible attachments are connected and extended therefrom over the pulleys r to the rear part of the dragging-frame I. The pulleys r being mounted upon the main frame directly above the point of attachment to the dragging-frame, or nearly so, a rotary movement of the shaft M will pull the dragging-frame up from the ground, and its weight will be supported entirely upon the main wheels. A lever, N, with the ordinary latch engaging with a rack, s, enables the driver to so raise the dragging-frame and hold it up from the ground.

The seat P for the driver is mounted upon arms t, which are pivoted at their lower ends to the seat-frame Q, resting against lugs u on said frame. With the seat in this adjustment the driver's weight is a little forward of the main axle, just sufficiently forward thereof to properly balance the machine when it is in operation; but when the dragging-frame is raised from the ground the driver's weight must be moved forward to counterpoise the additional weight at the rear, and the arms are then moved over forward upon the pivots until they rest against the lugs i.

When the seat is thrown backward, as described, the driver may rest his feet upon the foot-rest R; but when the seat is thrown forward, as described, he rests his feet upon the double-tree S.

With machines of this character it is important that the driver shall be in position to see exactly the position of the grain to be taken up, and the center of the machine, in the plane of the binding devices, is the best, if not the only, position where supervision of the operation of the machine can be satisfactorily performed. I therefore mount the seat P above in the plane of motion of the binding-arm, and I also place the spool or receptacle for the binding material at k, beneath the double-tree S, so that the part of said binders' material extending from k backward to the binding devices will be in sight of the driver and constitute a gage-line by which he may regulate the exact position of the machine as to the grain to be taken up and bound. For the same reason and for the purpose of putting the horses far apart, so that they shall not trample the grain, I make the pole or tongue of two parts, T T, united at their forward ends, but diverging backward, and rigidly fastened at their rear ends to the bar A at either side of the driver's-seat frame.

A cross-bar, w, supports the double-tree attachment and spool or receptacle k. A long neck-yoke, U, is attached in the ordinary way to the end of the tongue T, and serves to keep the horses at the proper distance apart. Ordinary single-trees V are mounted at the ends of the double-tree S for the attachment of the horses.

By this structure the driver has an unobstructed view of the ground in front of the machine, and can guide it unerringly in the proper line.

The bearing-wheels W are provided with the ordinary hub, ratchet, and pawls, whereby they may be revolved freely backward. The teeth d and h are made of wrought metal, and are secured in dovetailed recesses in a cast-metal collar, y, and secured therein by a plain collar bolted firmly to the collar y, or securely held against it by bolting the cylinder. The shield-plate Y incloses the space between the seat-frame Q and prevents the escape of the straw forward during the process of binding.

Having described my invention, what I claim as new is—

1. In a two-horse gleaner and binder, a binding apparatus and a driver's seat, both located in the same plane, and a spool for the binding material located in front of said seat, so that the wire extending therefrom may serve as a visible guide-line, combined with a draft-pole constructed of two parts, joined at their front end and spread wide apart at their rear ends, whereby the driver may have a clear view of the ground along the median line of advance, for the purpose stated.

2. The gatherer H, mounted in a dragging-frame supported at the rear upon wheels J J, combined with the levers L L, in engagement with the front ends of the arms g g, whereby the ends of said dragging-frame may be independently raised or lowered at the front while the machine is in motion.

3. The gatherer H, mounted in a dragging-frame supported at the rear upon wheels, and adjustable as to height at the front, combined with independent adjusting-levers L, whereby each end of the gatherer may be independently lifted.

4. The gatherer H, mounted in a dragging-frame supported at the rear upon wheels, and combined with the slotted brackets i, which swing upon the main axle and are pivoted to the arms g of said dragging-frame, and the elbow or bell-crank levers L, pivoted to said bracket and engaging with said arm g, as set forth.

5. In a gleaner and binder having the driver's seat in the plane of motion of the binding devices, a spool or receptacle, k, located in front of and below the driver's seat, so that the binding material extending therefrom to the binding apparatus may constitute a gage-line by which he can guide the machine truly as to the grain to be gleaned and bound.

6. The arms g of the dragging-frame, pivoted in the brackets i, which swing upon bearings at or near the main axle, whereby said dragging-frame may be raised up by vibrating said brackets upon their pivotal bearings.

7. The arms g, pivoted to and extending within the brackets i, combined with the bell-crank levers L, also pivoted to the brackets i, whereby said brackets and dragging-frame may be lifted up, as set forth.

8. The arms g and brackets i, pivoted together and overlapping each other, so that when at the lowest position they rest upon each other and limit their downward movement, combined with a bell-crank lever, L, pivoted to said bracket and engaged with said arm g at a distance from its pivot, whereby said bracket may be raised up, as set forth.

9. The cylinders D H, provided with teeth d h, made in triangular form of sheet or flat metal, so as to be unyielding and inflexible, combined with collars around said cylinders, provided with sockets for said teeth, and confining-plates to keep the teeth in place.

10. A gleaner and binder whereof the elevator and binder are mounted upon the main frame, and the gatherer mounted upon a frame flexibly connected with said main frame, so that when the said gatherer is upon the ground it may follow the undulations thereof independently of the main frame, combined with lifting devices, whereby the gatherer may be lifted entirely from the ground or its height therefrom regulated at will.

W. N. WHITELEY.

Witnesses:
W. F. BEVITT,
E. H. BARNES.